(12) United States Patent
Mikasa

(10) Patent No.: US 7,753,028 B2
(45) Date of Patent: Jul. 13, 2010

(54) CONTROL APPARATUS AND METHOD FOR INTERNAL COMBUSTION ENGINE

(75) Inventor: Yoshinori Mikasa, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 12/363,943

(22) Filed: Feb. 2, 2009

(65) Prior Publication Data
US 2009/0199817 A1    Aug. 13, 2009

(30) Foreign Application Priority Data
Feb. 8, 2008    (JP)    ............... 2008-029085

(51) Int. Cl.
*F02P 5/15*    (2006.01)
(52) U.S. Cl. ............ 123/406.53; 123/406.54; 123/406.55
(58) Field of Classification Search ............ 123/406.53, 123/406.54, 406.55
See application file for complete search history.

(56) References Cited

U.S. PATENT DOCUMENTS

| | | | | |
|---|---|---|---|---|
| 4,416,234 A | * | 11/1983 | Ikeura | ............ 123/406.53 |
| 4,421,085 A | * | 12/1983 | Nagase et al. | ........ 123/406.55 |
| 4,606,315 A | * | 8/1986 | Tobinaga et al. | ........ 123/335 |
| 4,703,733 A | * | 11/1987 | Fukutomi et al. | ...... 123/406.52 |
| 4,712,527 A | * | 12/1987 | Staerzl | ............ 123/406.51 |
| 4,903,662 A | * | 2/1990 | Hirukawa et al. | ............ 477/101 |
| 4,987,873 A | * | 1/1991 | Schenk | ............ 123/406.55 |
| 6,212,879 B1 | * | 4/2001 | Nishimura et al. | ............ 60/274 |
| 6,598,588 B2 | * | 7/2003 | Yuya | ............ 123/406.54 |
| 6,978,761 B2 | * | 12/2005 | Meyer | ............ 123/406.53 |
| 2002/0160879 A1 | * | 10/2002 | Kidokoro et al. | ............ 477/110 |

FOREIGN PATENT DOCUMENTS

| | | |
|---|---|---|
| JP | 05-256237 A | 10/1993 |
| JP | 06-017730 A | 1/1994 |
| JP | 2005-214125 A | 8/2005 |
| JP | 2006-002618 A | 1/2006 |

* cited by examiner

*Primary Examiner*—Erick Solis
(74) *Attorney, Agent, or Firm*—Sughrue Mion, PLLC

(57) ABSTRACT

A fixed ignition mode in which ignition timing is fixed to a predetermined timing is selected when an engine speed is low. When in the fixed ignition mode, it is determined whether the engine is in a high temperature state or in a non-high temperature state and whether during or after a start-up of the engine. Then, the ignition timing is fixed to a first crank angle when the engine is in the non-high temperature state, and fixed to a second crank angle retarded from the first crank angle when the engine is in the high temperature state and during the start-up. The ignition timing is fixed to a third crank angle advanced from the second crank angle when the engine is in the high temperature state and that the start-up has been completed.

16 Claims, 4 Drawing Sheets

| | DURING START-UP (COMBUSTION CHAMBER: ATMOSPHERIC PRESSURE) | AFTER STATE-UP (COMBUSTION CHAMBER: NEGATIVE PRESSURE) |
|---|---|---|
| HIGH TEMPERATURE STATE | FANG1 | ADVANCED FROM FANG1 (FOR EXAMPLE, FANG0) |
| NON-HIGH TEMPERATURE STATE | FANG0 | FANG0 |

FANG0: NORMAL FIXED IGNITION TIMING (FOR EXAMPLE, 5° BTDC)
FANG1: HIGH-TEMPERATURE FIXED IGNITION TIMING (RETARDED FROM FANG0)

FIG. 3
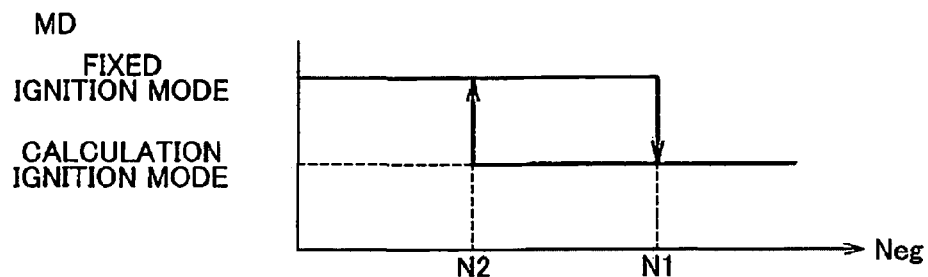
FIG. 4
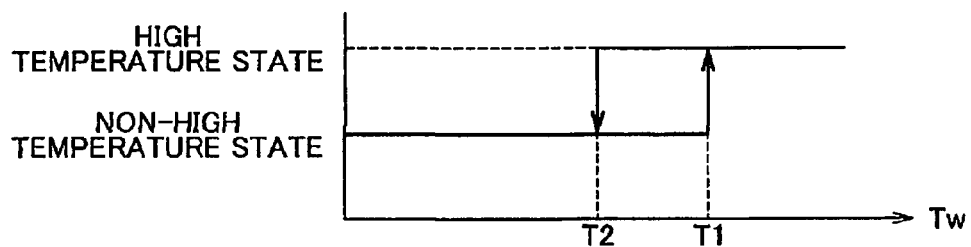
FIG. 5
| | DURING START-UP (COMBUSTION CHAMBER: ATMOSPHERIC PRESSURE) | AFTER STATE-UP (COMBUSTION CHAMBER: NEGATIVE PRESSURE) |
|---|---|---|
| HIGH TEMPERATURE STATE | FANG1 | ADVANCED FROM FANG1 (FOR EXAMPLE, FANG0) |
| NON-HIGH TEMPERATURE STATE | FANG0 | FANG0 |
FANG0: NORMAL FIXED IGNITION TIMING
(FOR EXAMPLE, 5° BTDC)
FANG1: HIGH-TEMPERATURE FIXED IGNITION TIMING
(RETARDED FROM FANG0)

CONTROL APPARATUS AND METHOD FOR INTERNAL COMBUSTION ENGINE

INCORPORATION BY REFERENCE

The disclosure of Japanese Patent Application No. 2008-029085 filed on Feb. 8, 2008 including the specification, drawings and abstract is incorporated herein by reference in its entirety:

BACKGROUND OF THE INVENTION

1. Field of the Invention

The invention relates to a control apparatus and a control method for an internal combustion engine, and in particular, relates to an ignition timing control executed when the internal combustion engine is operated at low speed.

2. Description of the Related Art

Ignition timing control in which ignition timing is accurately controlled in accordance with operating conditions of an engine is commonly practiced as a part of engine control. As one mode of such ignition timing control, control for efficiently operating an engine is executed, in which a fixed ignition process is performed during a start-up of the engine so as to maintain the ignition timing at a predetermined angle in order to improve startability of the engine, and after the start-up of the engine, a shift is made from the fixed ignition process to a calculation ignition process in which the optimal ignition timing calculated based on the operating conditions of the engine is set.

For example, Japanese Patent Application Publication No. 5-256237 (JP-A-5-256237) describes a configuration of an ignition angle control apparatus by which it is possible to suppress occurrence of knocking even when the engine is restarted at high temperature. In the configuration, the ignition angle is determined based on a crank angle signal (rotary phase signal) that is retarded in terms of time by retarding means. In this configuration, even at the time of engine start when it is difficult to determine the optimal ignition angle based on an engine speed and other operating state quantities, it is possible to substantially retard the ignition angle, whereby occurrence of knocking is suppressed even at the time of engine restart at high temperature.

Further, Japanese Patent Application Publication No. 2006-002618 (JP-A-2006-002618), Japanese Patent Application Publication No. 2005-214125 (JP-A-2005-214125), and Japanese Patent Application Publication No. 6-017730 (JP-A-6-017730) describe related arts pertaining to the ignition timing control executed at the time of engine start.

On the other hand, the engine speed during idling operation of the engine (hereinafter referred to as "idling speed") is set low in order to improve fuel consumption. In this specification, "engine speed" indicates a number of rotation per unit time (e.g. a number of rotation per minute: rpm).

When the idling speed is set low in this way, in the ignition timing control in which the fixed ignition process is performed when it is detected that the engine is during a start-up based on the engine speed, there is a possibility that the engine may stall due to decreased output if the ignition timing is simply retarded at high temperature for the purpose only of suppressing occurrence of knocking, as described in JP-A-5-256237. However, the descriptions of the ignition timing control in JP-A-5-256237, JP-A-2006-002618, JP-A-2005-214125, and JP-A-6-017730 do not mention the possibility of engine stall caused by retardation of the ignition timing.

SUMMARY OF THE INVENTION

The invention provides a control apparatus and a control method for an internal combustion engine that appropriately set ignition timing when the internal combustion engine is operated at low speed so as to allow the internal combustion engine to be stably operated even when an engine speed during idling operation is low.

A first aspect of the invention relates to a control apparatus for an internal combustion engine in which an ignition mechanism is provided for each cylinder. The control apparatus for an internal combustion engine according to the first aspect of the invention includes an engine speed detection section that detects a speed of the internal combustion engine, an ignition mode selection section, a start/operation determination section, and a fixed ignition control section. The ignition mode selection section selects a fixed ignition mode in which ignition timing is fixed to a predetermined timing when the detected engine speed is low. The start/operation determination section determines whether the internal combustion engine is during a start-up or is in operation after a completion of the start-up when in the fixed ignition mode. The fixed ignition control section controls the ignition timing when in the fixed ignition mode. When the internal combustion engine is in a non-high temperature state in which a temperature of the internal combustion engine is lower than a predetermined temperature, the fixed ignition control section fixes the ignition timing at a first crank angle. When the internal combustion engine is in a high temperature state in which the temperature of the internal combustion engine is equal to or higher than the predetermined temperature, the fixed ignition control section fixes the ignition timing at a second crank angle retarded from the first crank angle when the start/operation determination section determines that the internal combustion engine is during the start-up, and at a third crank angle advanced from the second crank angle when the start/operation determination section determines that the internal combustion engine is in operation after the completion of the start-up.

A second aspect of the invention relates to a control apparatus for an internal combustion engine in which an ignition mechanism is provided for each cylinder. The control apparatus for an internal combustion engine according to the second aspect of the invention includes an engine speed detection section that detects a speed of the internal combustion engine, a start/operation determination section, and a fixed ignition control section. The start/operation determination section determines whether the internal combustion engine is during a start-up or is in operation after a completion of the start-up. When the detected engine speed is lower than a predetermined engine speed, the fixed ignition control section fixes an ignition timing of the internal combustion engine at: (a) a first crank angle when the internal combustion engine is in a non-high temperature state in which operation of the internal combustion engine is stable even if the ignition timing after the completion of the start-up of the internal combustion engine is retarded by an angle the same as a retardation angle during the start-up; (b) a second crank angle retarded from the first crank angle when the internal combustion engine is in a high temperature state in which the operation of the internal combustion engine becomes unstable if the ignition timing after the completion of the start-up is retarded by the angle the same as the retardation angle during the start-up, and the start/operation determination section determines that the internal combustion engine is during the start-up; and (c) a third crank angle advanced from the second crank angle when the internal combustion engine is in the high temperature state, and the start/operation determination section determines that the internal combustion engine is in operation after the completion of the start-up.

A third aspect of the invention relates to a method of controlling an internal combustion engine in which an ignition mechanism is provided for each cylinder. The method of controlling an internal combustion engine includes: detecting a speed of the internal combustion engine; selecting a fixed ignition mode in which an ignition timing is fixed to a predetermined timing when the detected engine speed is low; determining, when in the fixed ignition mode, whether the internal combustion engine is in a high temperature state in which a temperature of the internal combustion engine is equal to or higher than a predetermined temperature, or in a non-high temperature state in which the temperature of the internal combustion engine is lower than the predetermined temperature; determining, when in the fixed ignition mode, whether the internal combustion engine is during a start-up or is in operation after a completion of the start-up; fixing the ignition timing at a first crank angle when it is determined that the internal combustion engine is in the non-high temperature state when in the fixed ignition mode; fixing the ignition timing at a second crank angle retarded from the first crank angle when it is determined that the internal combustion engine is in the high temperature state and is during the start-up when in the fixed ignition mode; and fixing the ignition timing at a third crank angle advanced from the second crank angle when it is determined that the internal combustion engine is in the high temperature state and is in operation after the completion of the start-up when in the fixed ignition mode.

A fourth aspect of the invention relates to a method of controlling an internal combustion engine in which an ignition mechanism is provided for each cylinder. The method of controlling an internal combustion engine includes detecting a speed of the internal combustion engine, and determining whether the internal combustion engine is during a start-up or is in operation after a completion of the start-up. Further, when the detected engine speed is lower than a predetermined engine speed, the method includes fixing an ignition timing of the internal combustion engine at: (a) a first crank angle when the internal combustion engine is in a non-high temperature state in which operation of the internal combustion engine is stable even if the ignition timing after the completion of the start-up of the internal combustion engine is retarded by an angle the same as a retardation angle during the start-up; (b) a second crank angle retarded from the first crank angle when the internal combustion engine is in a high temperature state in which the operation of the internal combustion engine becomes unstable if the ignition timing after the completion of the start-up is retarded by the angle the same as the retardation angle during the start-up, and the start/operation determination section determines that the internal combustion engine is during the start-up; and (c) a third crank angle advanced from the second crank angle when the internal combustion engine is in the high temperature state, and the start/operation determination section determines that the internal combustion engine is in operation after the completion of the start-up.

According to the control apparatus and method for an internal combustion engine as described above, when the engine is in operation after the completion of the start-up, even when the fixed ignition mode is selected due to the fluctuated engine speed, it is possible to avoid a situation in which the fixed ignition timing in the high temperature state of the engine is retarded in a manner the same as or similar to the case where the engine is during the start-up, considering that the pressure in the combustion chamber is negative. As a result, when the engine is in the high temperature state, it is possible to suppress occurrence of knocking during the start-up of the engine, and further, even when the engine speed decreases during idling operation, it is possible to prevent inappropriate setting of the fixed ignition timing, and it is therefore possible to suppress stalling of the engine. This makes it possible to suppress unstable operation of the engine when the engine is operated at low engine speed, whereby it is possible to smoothly reduce the idling speed in order to achieve lower fuel consumption.

According to the invention, it is possible to appropriately set ignition timing when the internal combustion engine is operated at low speed so as to allow the internal combustion engine to; be stably operated, even when an engine speed during idling operation is low.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 3 schematically illustrates an ignition mode setting performed by an ignition mode selection section shown in FIG. 2;

FIG. 4 schematically illustrates how it is determined whether the engine is in a high temperature state or in a non-high temperature state;

FIG. 5 is a table illustrating the ignition timing setting in a fixed ignition mode.

DETAILED DESCRIPTION OF EMBODIMENTS

Figure 1:
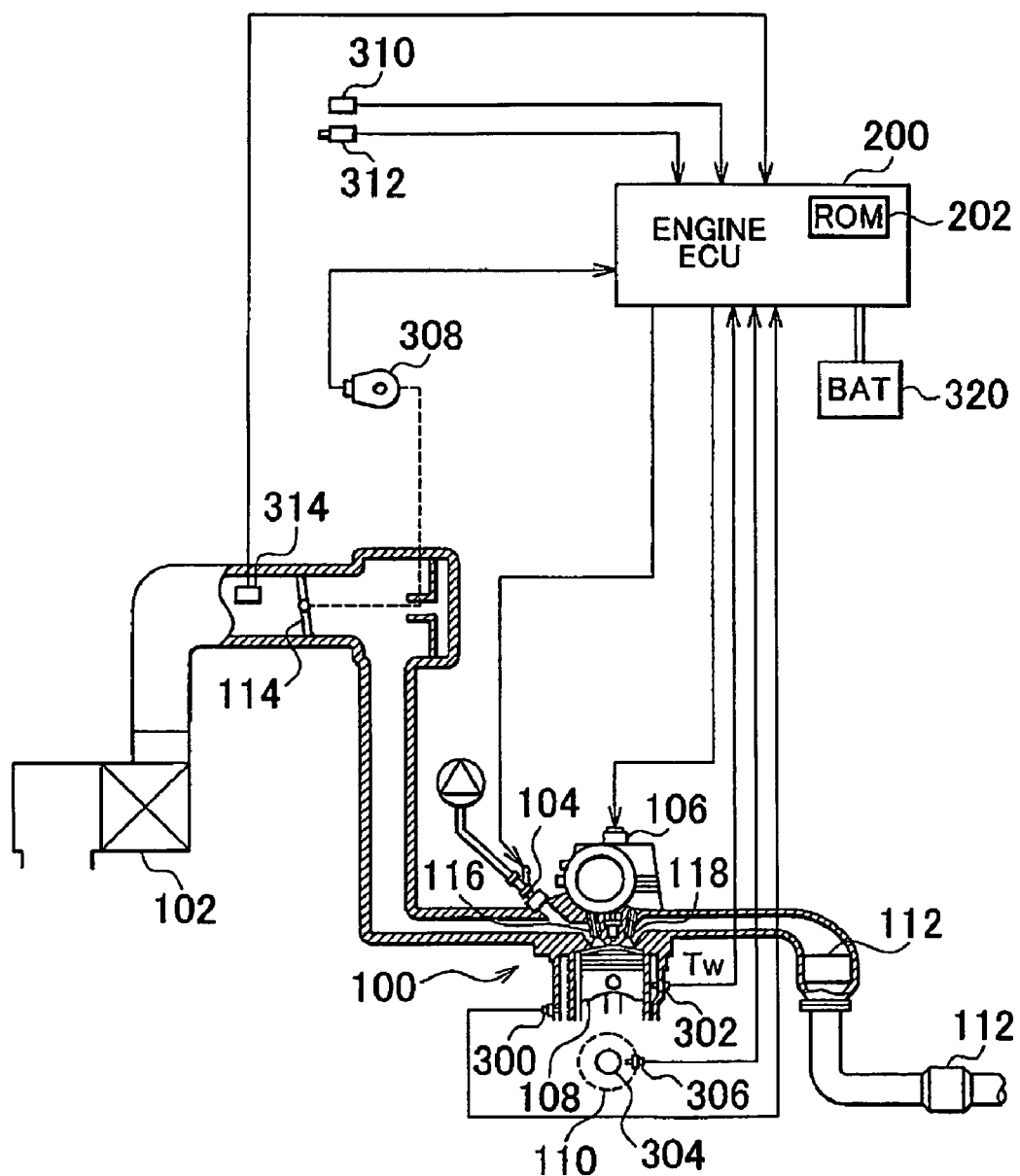
FIG. 1 schematically shows the configuration of an internal combustion engine of a vehicle equipped with a control apparatus for ah internal combustion engine according to an embodiment of the invention.

An embodiment of the invention will be hereinafter described in detail with reference to the attached drawings. The same or equivalent components or portions will be denoted by the same reference numerals, and in principle, the description thereof will not be repeated.

First, referring to FIG. 1, the configuration of an internal combustion engine of a vehicle, equipped with a control apparatus for an internal combustion engine according to the embodiment of the invention will be described.

As shown in FIG. 1, an engine 100 is provided with a plurality of cylinders. An engine electronic control unit (ECU) 200, for example, functions as the control apparatus for an internal combustion engine according to the embodiment.

In the engine 100, the air introduced from an air cleaner 102 is mixed with fuel injected from an injector 104, and the air-fuel mixture thus formed is ignited by a spark plug 106 in each combustion chamber so as to burn therein. Ignition timing is controlled, as described in: detail later in this specification, in accordance with operating conditions of the engine 100.

When the air-fuel mixture is burnt, a piston 108 in each cylinder is pushed down due to a combustion pressure produced in the combustion chamber, and this rotates a crankshaft 110. The burnt air-fuel mixture (exhaust gas) is purified by a three-way catalyst 112, and is discharged to the outside of the vehicle. The amount of air introduced into the engine 100 is adjusted by a throttle valve 114. When an intake valve 116 is opened, the air-fuel mixture is introduced into the combustion chamber. Further, when an exhaust valve 118 is opened, the exhaust gas is discharged from the combustion chamber.

The engine ECU 200 controls the engine 100. The engine ECU 200 is connected to a knock sensor 300, a water temperature sensor 302, a crank position sensor 306 that is disposed facing a timing rotor 304, a throttle opening sensor 308, a vehicle speed sensor 310, an ignition switch 312, and an airflow meter 314.

The knock sensor 300 is provided in a cylinder block of the engine 100. The knock sensor 300 includes a piezoelectric element, and outputs voltage when the engine 100 vibrates. The magnitude of voltage corresponds to the magnitude of vibration of the engine. The knock sensor 300 sends a signal indicative of voltage to the engine ECU 200. The water temperature sensor 302 detects the temperature of cooling water (cooling water temperature Tw) in a water jacket of the engine 100, and sends a signal indicative of the detected cooling water temperature to the engine ECU 200.

The crankshaft 110 is provided with the timing rotor 304 in a manner such that the timing rotor 304 rotates with the crankshaft 110. A plurality of projections are provided on an outer periphery of the timing rotor 304 at predetermined intervals. The crank position sensor 306 is disposed so as to face each of the projections provided on the outer periphery of the timing rotor 304 as the timing rotor 304 rotates. When the timing rotor 304 rotates, an air gap between the outer periphery of the timing rotor 304 and the crank position sensor 306 varies, which varies the magnetic flux that passes through a coil portion of the crank position sensor 306, whereby an electromotive force is produced in the coil portion. The crank position sensor 306 sends a signal indicative of the electromotive force to the engine ECU 200. The engine ECU 200 detects a crank angle and the number of revolutions of the crankshaft 110 (that is, the engine speed) based on the signal sent from the crank position sensor 306.

The throttle opening sensor 308 detects the degree of throttle opening, and sends a signal indicative of the detected throttle opening to the engine ECU 200. The vehicle speed sensor 310 detects the number of revolutions of each wheel (not shown) and sends a signal indicative of the detected number of revolutions of the wheel to the engine ECU 200. The engine ECU 200 calculates the vehicle speed based on the detected number of revolutions of the wheel. The ignition switch 312 is turned on by a driver in order to start the engine 100. The air flow meter 314 detects the amount of air introduced into the engine 100 and sends a signal indicative of the detected amount of air to the engine ECU 200.

The engine ECU 200 is operated by power supplied from an auxiliary battery 320, which functions as a power source. The engine ECU 200 performs computations based on the signals sent from the sensors described above and the ignition switch 312 in accordance with a map and a program stored in a read-only memory (ROM) 202, and controls various instruments so that the engine 100 is operated in the desired operating conditions. Alternatively, at least a part of the engine ECU 200 may be configured to execute predetermined numerical and logical operations by hardware, such as an electronic circuit.

In the embodiment, the engine ECU 200 controls the ignition timing of the ignition plug 106 based on the signals sent from the sensors, which indicate the operating conditions of the engine 100. As is commonly known, the ignition timing is represented by a crank angle relative to a top dead center (TDC).

Figure 2:
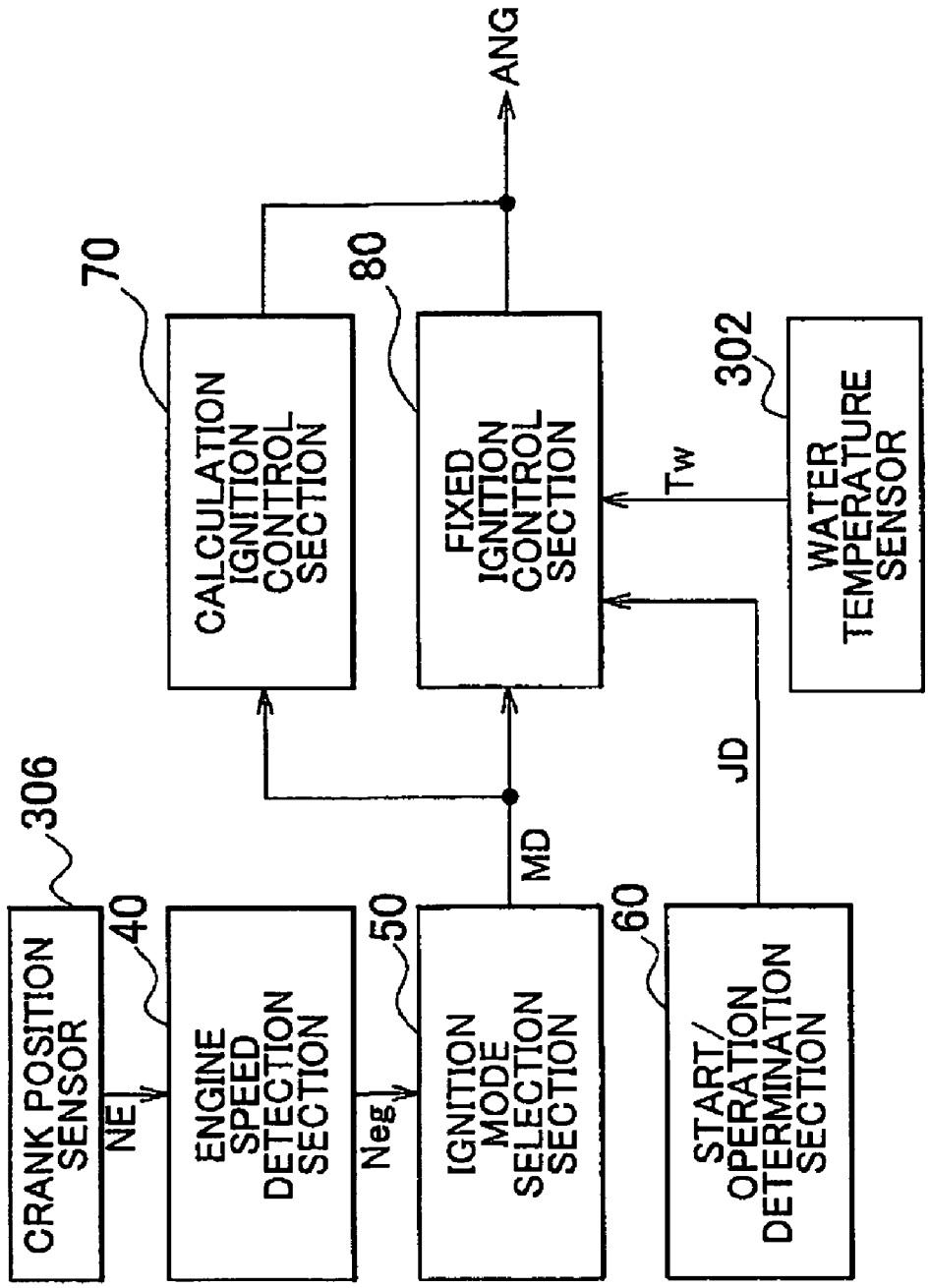
FIG. 2 is a functional block diagram illustrating an ignition timing control according to the embodiment of the invention.

FIG. 2 is a functional block diagram illustrating the ignition timing control according to the embodiment of the invention. Each functional block shown in FIG. 2 may be implemented by a circuit (hardware) that has a function corresponding to the functional block, or may be embodied in a manner such that the engine ECU 200 performs a software process in accordance with a preset program.

Referring to FIG. 2, an engine speed detection section 40 calculates the number of revolutions of the crankshaft 110, that is, an engine speed Neg, based on the signal output from the crank position sensor 306. An ignition mode selection section 50 selects the ignition mode in accordance with the engine speed Neg detected by the engine speed detection section 40.

Next, it will be described, referring to FIG. 3, how the ignition mode is selected by the ignition mode, selection section 50 based on the engine speed Neg.

As shown in FIG. 3, when a start command of the engine 100 is issued (that is, when Neg=0 is established), the ignition mode is initially set to a fixed ignition mode. The engine speed Neg increases as the start-up process of the engine 100 progresses, and when the engine speed Neg exceeds an engine speed N1 (Neg>N1), the ignition mode is switched to a calculation ignition mode; that is, the fixed ignition mode is unselected.

Further, when the calculation ignition mode is once selected (that is, the fixed ignition mode is not selected), the fixed ignition mode is selected when the engine speed Neg falls below an engine speed N2 (Neg<N2). In this way, the ignition mode selection section 50 functions in a manner such that the fixed ignition mode is selected when the engine speed Neg is low.

The engine speed N2 is set lower than the engine speed N1 (N2<N1). This makes it possible to provide hysteresis when the ignition mode is selected, thereby suppressing occurrence of hunting, which is a frequent switching of the ignition mode.

Referring to FIG. 2 again, the ignition mode selection section 50 sets an ignition mode signal MD to "1" when the fixed ignition mode is selected, and sets the ignition, mode signal MD to "0" when the calculation ignition mode is selected. The ignition mode signal MD is transmitted to a calculation ignition control section 70; and a fixed ignition control section 80.

When the ignition mode signal MD is 0 (MD=0), that is, the calculation ignition mode is selected, the calculation ignition control section 70 sets the optimal ignition timing in accordance with the operating conditions of the engine 100 so as to improve fuel consumption and suppress occurrence of knocking, without reducing efficiency of the engine 100 and an output from the engine 100. For example, an ignition timing (ignition angle) ANG in the calculation ignition mode is set as needed based on changes of the operating conditions of the engine 100 by, for example, referring to a map that is preset in accordance with experimental results, etc., or executing, a feedback control based on the detection results of the knock sensor 300 in addition to the reference to the preset map.

When the ignition mode signal MD is 1 (MD=1), that is, when in the fixed ignition mode, the fixed ignition control section 80 executes control to fix the ignition timing (ignition angle) ANG at a predetermined crank angle. As described above, at the time of the engine start or immediately after the engine start, the operating conditions of the engine 100 are unstable, and state values, such as a pressure in an intake pipe, are also unstable. Therefore, the fixed ignition control section 80 executes the control to fix the ignition timing at the empirically obtained timing at which the engine 100 is stably started.

However, in the typical selection of the ignition mode that is made based on the engine speed as shown in FIG. 3, when the idling speed is set low, the fixed ignition mode may be possibly selected due to a fluctuation of the engine speed even if the engine is in operation after a predetermined period has elapsed from the completion of the start-up of the engine. For example, as the target idling speed becomes closer to the engine speed N2 shown in FIG. 3, the above-described case becomes more likely to occur.

A start/operation determination section 60 determines, after the start command of the engine 100 is issued, whether the engine 100 is during the start-up or is in operation after the completion of the start-up, and outputs a determination signal JD indicative of the determination result.

The fixed ignition control section 80 receives, in addition to the ignition mode signal MD, the determination signal JD output from the start/operation determination section 60 and a cooling water temperature Tw detected by the water temperature sensor 302. The cooling water temperature Tw is defected in order to detect the temperature of the engine 100, and the temperature of the engine 100 may be detected based on output values from other sensors or by performing computations.

As shown in FIG. 4, when the fixed ignition mode is selected, the fixed ignition control section 80 determines whether the temperature of the engine 100 is high (hereinafter referred to as a "high temperature state") or not high (hereinafter referred to as a "non-high temperature state") based on the cooling water temperature Tw.

Referring to FIG. 4, when the determination result is the non-high temperature state, the event that the cooling water temperature Tw exceeds a predetermined cooling water temperature T1 (Tw>T1) triggers the fixed ignition control section 80 to change the determination result from the non-high temperature state to the high temperature state. Further, when the determination result is the high temperature state, the event that the cooling water temperature Tw falls below a predetermined cooling water temperature T2 (Tw<T2) triggers the fixed ignition control section 80 to change the determination result from the high temperature state to the non-high temperature state. It should be noted that the temperatures T1, T2 are set so as to satisfy T2<T1. Because the temperatures T1, T2 are set in the above manner, it is possible to suppress frequent switching of the determination result between the high temperature state and the non-high temperature state in a hunting manner as described above, as in the case of the selection of the ignition mode shown in FIG. 3.

When the start command of the engine 100 is issued, the initial setting is the non-high temperature state. However, when it is determined that the cooling water temperature Tw exceeds the temperature T1 (Tw>T1) at the time of start-up, the result of determining the temperature state is changed from the non-high temperature state to the high temperature state, and such determination that the engine 100 is in the high temperature state is kept until the cooling water temperature Tw falls below the temperature T2 (Tw<T2).

Referring to FIG. 5, the fixed ignition control section 80 sets the ignition timing (ignition angle) in the fixed ignition mode based on the cooling water temperature Tw and the determination signal JD, which indicate whether the engine 100 is in the high temperature state or in the non-high temperature state, and whether the engine 100 is during the start-up or is in operation after the completion of the start-up, respectively.

When the engine 100 is operated at low speed during the start-up, and the fixed ignition mode is selected, the fixed ignition control section 80 sets the fixed ignition timing in accordance with the temperature of the engine 100. More specifically, when the engine 100 is in the non-high temperature state, the fixed ignition control section 80 sets a normal fixed ignition timing FANG0, for example, at 5° before top dead center (hereinafter abbreviated as "BTDC"). On the other hand, when the engine 100 is in the high temperature state, in order to suppress the occurrence of knocking, the fixed ignition control section 80 sets a high-temperature, fixed ignition timing FANG1, which is retarded from the normal fixed ignition timing FANG0, for example, to −10° BTDC, that is, 10° after top dead center (hereinafter abbreviated as "ATDC"). This setting makes it possible to start the engine 100 while suppressing the occurrence of knocking by retarding the ignition timing when the engine 100 is in the high temperature state.

When the pressure in the combustion chamber is negative after the completion of the start-up of the engine 100, the engine 100 may stall due to decreased output if the ignition timing is retarded in a manner the same as or similar to the manner during the start-up of the engine when the pressure in the combustion chamber is atmospheric.

Therefore, when the fixed ignition mode is selected during low engine speed after the completion of the start-up (that is, the engine is in operation), the normal fixed ignition timing FANG0 is set when the engine 100 is in the non-high temperature state, and the ignition timing is fixed at a predetermined crank angle advanced from the high-temperature fixed ignition timing FANG1 when the engine 100 is in the high temperature state. Further, when the fixed ignition mode is selected during low engine speed after the completion of the start-up, the normal fixed ignition timing FANG0 may be set as the ignition timing regardless of whether the engine 100 is determined to be in the non-high temperature state or in the high temperature state, in order to simplify the control and assure stable start-up of the engine 100.

In this way, it is possible to suppress unstable operation of the engine 100 caused by indiscriminately retarding the ignition timing when the engine 100 is in the high temperature state when the engine 100 is operated at low speed after the completion of the start-up and thus it is possible to avoid stalling of the engine 100.

In other words, the start/operation determination section 60 determines whether the engine 100 is during the start-up or is in operation after the completion of the start-up in order to determine whether retardation of the ignition timing performed in the high temperature state of the engine 100 is appropriate, as described above. For example, when a flag, indicating that the engine 100 is in operation after the completion of the start-up (hereinafter simply referred to as "engine operation flag"), that is turned on after a predetermined time has elapsed or the crankshaft 110 makes a predetermined number of revolutions after the start of the engine 100, and, the ignition mode is switched from the fixed ignition mode, which has been set as the initial setting, to the calculation ignition mode is set, the start/operation determination section 60 can make the determination based on the engine operation flag set as described above. The engine operation flag may be turned off when stalling of the engine 100 is detected or a starter is turned on (that is, when the start command of the engine 100 is issued).

Alternatively, the start/operation determination section 60 may be configured so that a determination engine speed is set based on a minimum engine speed at which the engine 100 can operate in a self-sustaining manner, and the set determination engine speed is compared with the engine speed Neg so as to determine whether the engine 100 is during the start-up or is in operation after the completion of the start-up. In this configuration, when the engine speed Neg is in the engine speed range in which the engine 100 cannot operate in a self-sustaining manner, it is determined that the engine 100 is during the start-up. On the other hand, when the engine speed Neg is in the engine speed range in which the engine 100 can operate in a self-sustaining manner, it is determined that the engine 100 is in operation after the completion of the start-up.

Figure 6:
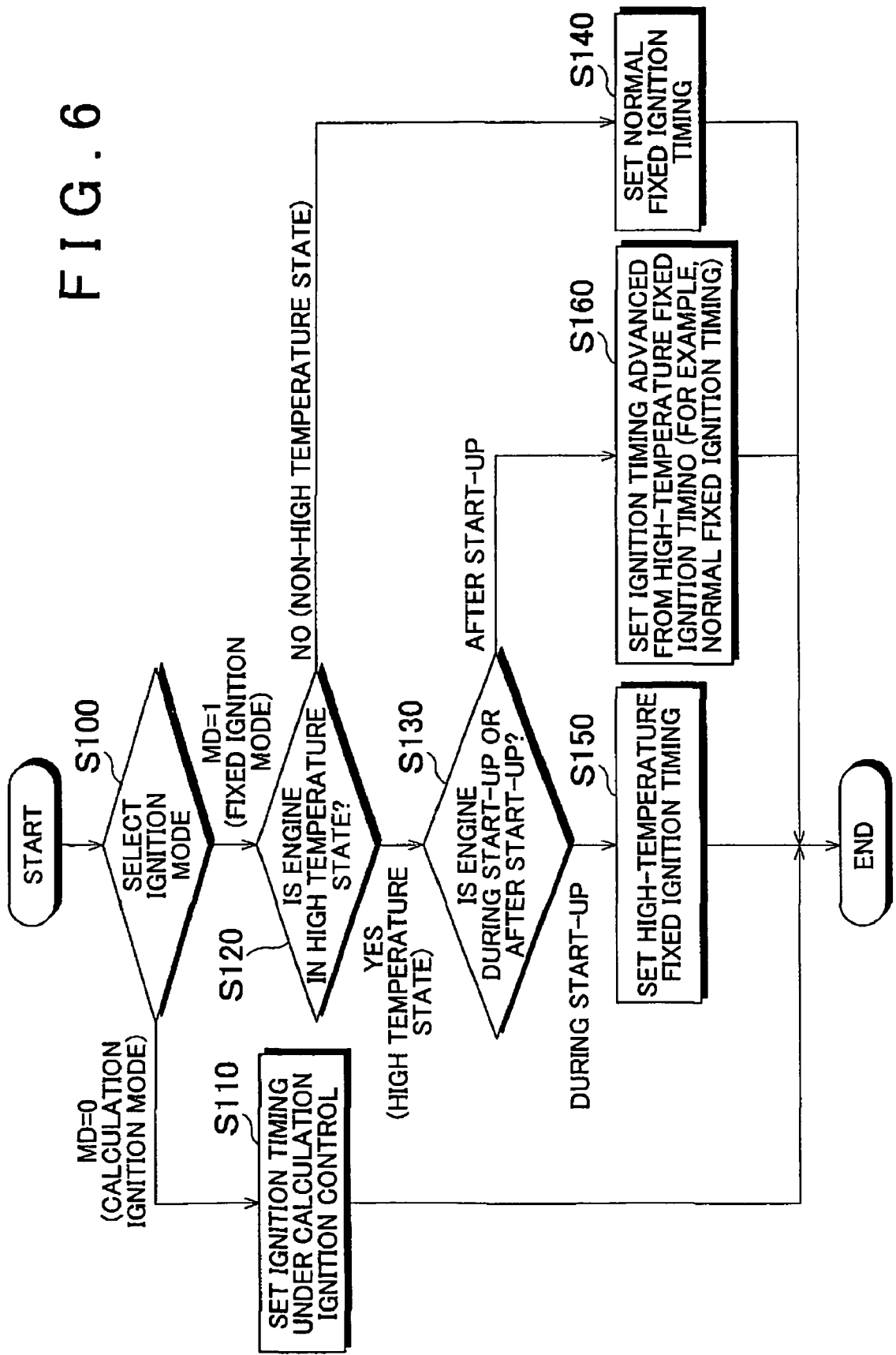
FIG. 6 is a flowchart showing a series of processes for executing the ignition timing control according to the embodiment of the invention.

FIG. 6 is a flowchart showing a series of processes, that constitute the ignition timing control executed by the control apparatus for an internal combustion engine according to the embodiment of the invention. The ignition timing control, which is shown in the form of the functional block diagram, in FIG. 2, may also be achieved in a manner such that a program, which is used for performing the processes shown in the flowchart in FIG. 6, which will be described below, is read out from the ROM 202, and a central processing unit (CPU) executes the program. The program is activated in predetermined control cycles so as to perform the series of processes.

Referring to FIG. 6, the engine ECU 200 selects the ignition mode in step S100 based on the engine speed Neg. The selection of the ignition mode in step S100 is performed as described using FIG. 3. In other words, the process in step S100 is performed by the ignition mode selection section 50 shown in FIG. 2.

When the calculation ignition mode is selected (MD=0), the engine ECU 200 sets the ignition timing in step S110 under the calculation ignition control. As described above, when the calculation ignition control is executed, the ignition timing that best matches the operating conditions of the engine 100 is set as needed by, for example, performing predetermined computations or referring to a predetermined map. The process in step S110 is performed by the calculation ignition control section 70 shown in FIG. 2.

On the other hand, when the fixed ignition mode is selected (MD=1), the engine ECU 200 determines, in step S120, whether the engine 100 is in the high temperature state, based on the cooling water temperature Tw.

Then, when it is determined that the engine 100 is in the non-high temperature state (NO in step S120), the process proceeds to step S140 in which the engine ECU 200 sets the ignition timing to the normal fixed ignition timing FANG0.

On the other hand, when it is determined that the engine 100 is in the high temperature state (YES in step S120), the engine ECU 200 determines, in step S130, whether the engine 100 is during the start-up or is in operation after the completion of the start-up. The determination in step S130 is made based on the determination signal JD shown in FIG. 2. In other words, the process in step S130 is performed by the start/operation determination section 60 shown in FIG. 2.

In the case of the selection of the fixed ignition mode that is made during the start-up of the engine 100, the process proceeds to step S150 in which the engine ECU 200 sets the ignition timing to the high-temperature fixed ignition timing FANG1. On the other hand, in the case of the selection of the fixed ignition mode that is made while the engine 100 is in operation, the process: proceeds to step S160 in which the engine ECU 200 sets the ignition timing to a timing advanced from the high-temperature fixed ignition timing FANG1. As described above, in step S160, the ignition timing may be set to the normal fixed ignition timing FANG0 by simply canceling the retardation of the ignition timing. In other words, the processes in steps S140 to S160 are performed by the fixed ignition control section 80 shown in FIG. 2, and the fixed ignition timing is set based on whether the engine 100 is in the high temperature state or in the non-high temperature state and whether the engine 100 is during the start-up or in operation after the completion of the start-up, as illustrated in FIG. 5.

As described above, according to the control apparatus for an internal combustion engine in the embodiment, when the engine 100 is in operation after the completion of the start-up, even if the fixed ignition mode is selected due to the fluctuated engine speed, it is possible to avoid a situation in which the fixed ignition timing when the engine 100 is in the high temperature state is retarded in a manner the same as or similar to when the engine 100 is during the start-up, considering that the pressure in the combustion chamber is negative. As a result, when the engine 100 is in the high temperature state, it is possible to suppress occurrence of knocking during the start-up of the engine 100, and further, even when the engine speed decreases during idling operation, it is possible to suppress stalling of the engine 100, which is caused by inappropriate setting of the fixed ignition timing. This makes it possible to suppress unstable operation of the engine 100 when the engine 100 is operated at low engine speed, whereby it is possible to smoothly reduce the idling speed in order to achieve lower fuel consumption.

When the start/operation determination section 60 determines that the engine 100 is in operation after the completion of the start-up, the fixed ignition control section 80 may fix the ignition timing to the normal fixed ignition timing FANG0. Alternatively, the fixed ignition control section 80 may fix the ignition timing to the normal fixed ignition timing FANG0 in step S160 in which the ignition timing is set to an advanced crank angle relative to the high-temperature fixed ignition timing FANG1.

In this configuration, when the engine 100 is in the high temperature state after the completion of the start-up, the retardation of the fixed ignition timing is canceled, and the fixed ignition timing; is set in a manner the same as or similar to the case where the engine 100 is in the non-high temperature state. This makes it possible to simplify the ignition timing control.

Further, the fixed ignition mode may be initially selected by the ignition mode selection section 50 or in step S100 when the start command of the engine 100 is issued. Further, when the ignition mode is in the fixed ignition mode, the fixed ignition mode may be unselected by the ignition mode selection section 50 or in step S100 when the engine speed Neg exceeds the engine speed N1, and when the ignition mode is not in the fixed ignition mode, the fixed ignition mode may be selected by the ignition mode selection section 50 or in step S100 when the engine speed Neg falls below the engine speed N1.

This makes it possible to provide hysteresis when the ignition mode is selected, whereby it is possible to suppress hunting, which is a frequent switching of the ignition mode. Further, if there are only two ignition modes, the selection of the ignition modes may be made based on a single predetermined engine speed.

Alternatively, the fixed ignition mode may be initially selected by the ignition mode selection section 50 or in step S100 when the start command of the engine 100 is issued, and further, when the ignition mode is in the fixed ignition mode, the fixed ignition mode may be unselected by the ignition mode selection section 50 or in step S100 when the engine speed Neg exceeds the engine speed N1, and when the ignition mode is not in the fixed ignition mode, the fixed ignition mode may be selected by the ignition mode selection section 50 or in step S100 when the engine speed Neg falls below the engine speed N1. Further, once a predetermined period of time has elapsed after the issuance of the start command and the fixed ignition mode is unselected, the start/operation determination section 60 may determine, or it may be determined in step S130 in which the determination as to whether the engine is during the start-up or in operation after the completion of the start-up is made, that the internal combustion engine is in operation after the completion of the start-up in subsequent selections of the fixed ignition mode.

This makes it possible to easily and appropriately detect a situation, brought about after the completion of the start-up of the engine 100, in which the fixed ignition timing in the fixed ignition mode should not be simply retarded even when the engine 100 is in the high temperature state.

Further, the fixed ignition mode, may be initially selected by the ignition mode selection section 50 or in step S100 when the start command of the engine 100 is issued, and further, when the ignition mode is in the fixed ignition mode, the fixed ignition mode may be unselected by the ignition mode selection section 50 or in step S100 when the engine speed Neg exceeds the engine speed N1, and, when the ignition mode is not in the fixed ignition mode, the fixed ignition mode may be selected by the ignition mode selection section 50 or in step S100 when the engine speed Neg falls below the engine speed N2, which is lower than the engine speed N1. Further, when the engine speed Neg is equal to or higher than the minimum engine speed at which the engine 100 can operate in a self-sustaining manner, it may be determined that the engine 100 is in operation after the completion of the start-up by the start/operation determination section 60 or in step S130 in which it is determined whether the engine 100 is during the start-up or is in operation after the completion of the start-up.

This makes it possible to easily and appropriately detect a situation, brought about after the completion of the start-up of the engine 100, in which the fixed ignition timing in the fixed ignition mode should not be simply retarded even when the engine 100 is in the high temperature state.

The ROM 202 that stores the program by which the processes in the flowchart shown in FIG. 6 are performed serves as a readable recording medium of a computer (CPU), which stores the program for executing the ignition timing control for an internal combustion engine according to the embodiment. It should be noted that the program may be stored in any recording medium, such as a compact disc (CD) or a digital versatile disc (DVD), so as to distribute the program in the market.

While the invention has been described with reference to example embodiments thereof, it should be understood that the invention is not limited to the example embodiments or constructions. To the contrary; the invention is intended to cover various modifications and equivalent arrangements. In addition, while the various elements of the example embodiments are shown in various combinations and configurations, which are example, other combinations and configurations, including more, less or only a single element, are also within the spirit and scope of the invention.

What is claimed is:

1. A control apparatus for an internal combustion engine in which an ignition mechanism is provided for each cylinder, the control apparatus comprising:
   an engine speed detection section that detects a speed of the internal combustion engine;
   an ignition mode selection section that selects a fixed ignition mode in which an ignition timing is fixed to a predetermined timing when the detected engine speed is low;
   a start/operation determination section that determines whether the internal combustion engine is during a start-up or is in operation after a completion of the start-up when in the fixed ignition mode; and
   a fixed ignition control section that controls the ignition timing when in the fixed ignition mode, wherein when the internal combustion engine is in a non-high temperature state in which a temperature of the internal combustion engine is lower than a predetermined temperature, the fixed ignition control section fixes the ignition timing at a first crank angle, and when the internal combustion engine is in a high temperature state in which the temperature of the internal combustion engine is equal to or higher than the predetermined temperature, the fixed ignition control section fixes the ignition timing at a second crank angle retarded from the first crank angle when the start/operation determination section determines that the internal combustion engine is during the start-up, and at a third crank angle advanced from the second crank angle when the start/operation determination section determines that the internal combustion engine is in operation after the completion of the start-up.

2. The control apparatus according to claim 1, wherein the fixed ignition control section fixes the ignition timing at the first crank angle when the start/operation determination section determines that the internal combustion engine is in operation after the completion of the start-up.

3. The control apparatus according to claim 1, wherein:
   when in the fixed ignition mode, the fixed ignition mode is unselected when the detected engine speed exceeds a first engine speed, and when not in the fixed ignition mode, the fixed ignition mode is selected when the detected engine speed falls below a second engine speed that is lower than the first engine speed.

4. The control apparatus according to claim 3, wherein the ignition mode selection section initially selects the fixed ignition mode when a start command of the internal combustion engine is issued.

5. The control apparatus according to claim 3, wherein once a predetermined period of time has elapsed after the issuance of the start command and the fixed ignition mode is unselected, the start/operation determination section determines that the internal combustion engine is in operation after the completion of the start-up in a subsequent selection of the fixed ignition mode.

6. The control apparatus according to claim 3, wherein when the fixed ignition mode is unselected, a calculation ignition mode is selected in which the ignition timing is varied based on an operating condition of the internal combustion engine.

7. The control apparatus according to claim 3, wherein the start/operation determination section determines that the internal combustion engine is in operation after the completion of the start-up when the detected engine speed is equal to or higher than a minimum engine speed at which the internal combustion engine can operate in a self-sustaining manner.

8. A control apparatus for an internal combustion engine in which an ignition mechanism is provided for each cylinder, the control apparatus comprising:
  an engine speed detection section that detects a speed of the internal combustion engine;
  a start/operation determination section that determines whether the internal combustion engine is during a start-up or is in operation after a completion of the start-up; and
  a fixed ignition control section, wherein when the detected engine speed is lower than a predetermined engine speed, the fixed ignition control section fixes an ignition timing of the internal combustion engine at:
  (a) a first crank angle when the internal combustion engine is in a non-high temperature state in which operation of the internal combustion engine is stable even if the ignition timing after the completion of the start-up of the internal combustion engine is retarded by an angle the same as a retardation angle during the start-up;
  (b) a second crank angle retarded from the first crank angle when the internal combustion engine is in a high temperature state in which the operation of the internal combustion engine becomes unstable if the ignition timing after the completion of the start-up is retarded by the angle the same as the retardation angle during the start-up, and the start/operation determination section determines that the internal combustion engine is during the start-up; and
  (c) a third crank angle advanced from the second crank angle when the internal combustion engine is in the high temperature state, and the start/operation determination section determines that the internal combustion engine is in operation after the completion of the start-up.

9. The control apparatus according to claim 8, wherein when the ignition timing is fixed, the fixed ignition control section unfixes the ignition timing when the detected engine speed exceeds a first engine speed, and when the ignition timing is not fixed, the fixed ignition control section fixes the ignition timing when the detected engine speed falls below a second engine speed that is lower than the first engine speed.

10. A method of controlling an internal combustion engine in which an ignition mechanism is provided for each cylinder, the method comprising:
  detecting a speed of the internal combustion engine;
  selecting a fixed ignition mode in which an ignition timing is fixed to a predetermined timing the detected engine speed is low;
  determining, when in the fixed ignition mode, whether the internal combustion engine is in a high temperature state in which a temperature of the internal combustion engine is equal to or higher than a predetermined temperature, or in a non-high temperature state in which the temperature of the internal combustion engine is lower than the predetermined temperature;
  determining, when in the fixed ignition mode, whether the internal combustion engine is during a start-up or is in operation after a completion of the start-up;
  fixing the ignition timing at a first crank angle when it is determined that the internal combustion engine is in the non-high temperature state when in the fixed ignition mode;
  fixing the ignition timing at a second crank angle retarded from the first crank angle when it is determined that the internal combustion engine is in the high temperature state and is during the start-up when in the fixed ignition mode; and
  fixing the ignition timing at a third crank angle advanced from the second crank angle when it is determined that the internal combustion engine is in the high temperature state and is in operation after the completion of the start-up when in the fixed ignition mode.

11. The method according to claim 10, wherein the fixing the ignition timing at the third crank angle includes fixing the ignition timing at the first crank angle.

12. The method according to claim 10, wherein the selecting the ignition mode includes unselecting the fixed ignition mode when the detected engine speed exceeds a first engine speed when in the fixed ignition mode, and selecting the fixed ignition mode when the detected engine speed falls below a second engine speed that is lower than the first engine speed when not in the fixed ignition mode.

13. The method according to claim 12, wherein the selecting the ignition mode includes initially selecting the fixed ignition mode when a start command of the internal combustion engine is issued.

14. The method according to claim 12, wherein the determining whether the internal combustion engine is during the start-up or is in operation after the completion of the start-up includes, once a predetermined period of time has elapsed after the issuance of the start command and the fixed ignition mode is unselected, determining that the internal combustion engine is in operation after the completion of the start-up in a subsequent selection of the fixed ignition mode.

15. The method according to claim 12, wherein the determining whether the internal combustion engine is during the start-up or is in operation after the completion of the start-up includes determining that the internal combustion engine is in operation after the completion of the start-up when the detected engine speed is equal to or higher than a minimum engine speed at which the internal combustion engine can operate in a self-sustaining manner.

16. A method of controlling an internal combustion engine in which an ignition mechanism is provided for each cylinder, the method comprising:
  detecting a speed of the internal combustion engine;
  determining whether the internal combustion engine is during a start-up or is in operation after a completion of the start-up; and
  fixing, when the detected engine speed is lower than a predetermined engine speed, an ignition timing of the internal combustion engine at: (a) a first crank angle when the internal combustion engine is in a non-high temperature state in which operation of the internal combustion engine is stable even if the ignition timing after the completion of the start-up of the internal combustion engine is retarded by an angle the same as a retardation angle during the start-up;
  (b) a second crank angle retarded from the first crank angle when the internal combustion engine is in a high temperature state in which the operation of the internal combustion engine becomes unstable if the ignition timing after the completion of the start-up is retarded by the angle the same as the retardation angle during the start-up, and the start/operation determination section determines that the internal combustion engine is during the start-up; and
  (c) a third crank angle advanced from the second crank angle when the internal combustion engine is in the high temperature state, and the start/operation determination section determines that the internal combustion engine is in operation after the completion of the start-up.

* * * * *